(12) United States Patent
Bomont et al.

(10) Patent No.: US 8,939,055 B2
(45) Date of Patent: Jan. 27, 2015

(54) CUTTING BLOCK FOR FOOD PRODUCTS

(71) Applicant: McCain Foods Limited, Florenceville-Bristol (CA)

(72) Inventors: Sylvain Bomont, La Madeleine (FR); Guilhem Carrier, Ablain St Nazaire (FR); Fabrice Desailly, Vimy (FR)

(73) Assignee: McCain Foods Limited, Florenceville-Bristol (CA)

( * ) Notice: Subject to any disclaimer, the term of this patent is extended or adjusted under 35 U.S.C. 154(b) by 0 days.

(21) Appl. No.: 14/173,226

(22) Filed: Feb. 5, 2014

(65) Prior Publication Data

US 2014/0224086 A1    Aug. 14, 2014

(30) Foreign Application Priority Data

Feb. 11, 2013    (FR) ...................................... 13 51119

(51) Int. Cl.
*B26D 7/06*    (2006.01)

(52) U.S. Cl.
USPC ...................... 83/13; 83/402; 83/858; 83/177

(58) Field of Classification Search
USPC ............................... 83/13, 177, 856–858, 402
See application file for complete search history.

(56) References Cited

U.S. PATENT DOCUMENTS

| | | | | |
|---|---|---|---|---|
| 2,119,260 A | * | 5/1938 | Valle | 30/301 |
| 2,483,173 A | * | 9/1949 | Behnke | 7/111 |
| 3,109,468 A | * | 11/1963 | Lamb et al. | 99/589 |
| 4,175,690 A | * | 11/1979 | Bova et al. | 227/76 |
| 4,300,429 A | * | 11/1981 | Brown et al. | 83/651.1 |
| 4,372,184 A | * | 2/1983 | Fisher et al. | 83/98 |
| 4,590,829 A | | 5/1986 | Davidson et al. | |
| 4,911,045 A | * | 3/1990 | Mendenhall | 83/98 |
| 5,009,141 A | * | 4/1991 | Julian et al. | 83/857 |
| 5,058,478 A | * | 10/1991 | Mendenhall | 83/857 |
| 5,173,352 A | | 12/1992 | Parker | |
| 5,337,640 A | * | 8/1994 | Arnoth et al. | 83/444 |
| 5,655,428 A | * | 8/1997 | Cockburn et al. | 83/857 |
| 5,673,863 A | | 10/1997 | Pallmann | |
| 6,047,625 A | * | 4/2000 | Mendenhall | 83/856 |
| 6,148,702 A | * | 11/2000 | Bucks | 83/13 |
| 6,536,691 B2 | | 3/2003 | Prewitt et al. | |
| 6,725,765 B1 | * | 4/2004 | Mendenhall | 99/537 |

(Continued)

OTHER PUBLICATIONS

Patent Cooperation Treaty, Notification of Transmittal of the International Search Report and the Written Opinion of the International Searching Authority, or the Declaration, dated May 1, 2014.

*Primary Examiner* — Sean Michalski
(74) *Attorney, Agent, or Firm* — Bereskin & Parr LLP/S.E.N.C.R.L., s.r.l.

(57) ABSTRACT

A cutting block and method for cutting food products is provided. The cutting block includes a plurality of parallel blades secured to a support. The blades extend in a direction along the breadth of the support and are arranged in pairs. Each pair of blades is positioned along the height of the support. Each blade in each pair is aligned along the height of the support and spaced apart along the length of the support. Each blade includes a straight first outer portion, a straight second outer portion, and a third middle portion joining the first outer portion to the second outer portion. The third middle portion is inclined relative to the first and second outer portions. The third middle portion includes first and second curved ends connected by a straight portion, wherein the first and second curved ends are each connected to a different one of the first and second outer portions.

19 Claims, 6 Drawing Sheets

(56) References Cited

U.S. PATENT DOCUMENTS

| | | | |
|---|---|---|---|
| 6,959,636 B2 * | 11/2005 | Graziano | 83/857 |
| 6,973,862 B2 * | 12/2005 | Bucks | 83/13 |
| D516,275 S * | 3/2006 | Anaya | D1/129 |
| 7,096,771 B2 * | 8/2006 | Mendenhall | 83/857 |
| 7,115,181 B2 * | 10/2006 | Tanaka et al. | 156/259 |
| 7,117,778 B2 * | 10/2006 | Fein et al. | 83/857 |
| 7,739,949 B2 * | 6/2010 | Justesen et al. | 99/547 |
| 7,811,615 B2 * | 10/2010 | Fein et al. | 426/144 |
| 8,104,391 B2 * | 1/2012 | McCracken et al. | 83/663 |
| 8,109,065 B2 | 2/2012 | Drebing et al. | |
| 8,438,961 B2 * | 5/2013 | Repac | 83/440.2 |
| D687,267 S * | 8/2013 | Harris et al. | D7/673 |
| D690,170 S * | 9/2013 | Harris et al. | D7/673 |
| D702,512 S * | 4/2014 | Harris et al. | D7/673 |
| 8,701,531 B2 * | 4/2014 | Beber et al. | 83/13 |
| D712,618 S * | 9/2014 | Rogers et al. | D1/125 |
| 2002/0146494 A1 | 10/2002 | Wilk et al. | |
| 2003/0232116 A1 * | 12/2003 | Fein et al. | 426/523 |
| 2004/0231482 A1 * | 11/2004 | Boilen | 83/425.3 |
| 2006/0169121 A1 * | 8/2006 | Fein et al. | 83/857 |
| 2007/0193429 A1 | 8/2007 | Neel et al. | |
| 2009/0193983 A1 * | 8/2009 | So | 99/537 |
| 2010/0236372 A1 * | 9/2010 | Desailly et al. | 83/857 |
| 2013/0087032 A1 * | 4/2013 | Walker et al. | 83/402 |
| 2014/0106049 A1 * | 4/2014 | Fillmore | 426/550 |

* cited by examiner

CUTTING BLOCK FOR FOOD PRODUCTS

FIELD

This application relates to the field of cutting food products, and more specifically to the field of cutting tools for cutting food products into several fragments.

INTRODUCTION

Known cutting blocks for food products include a support extending in length parallel to a downstream direction of food products, and a plurality of blades fixed to the support and extending perpendicularly to the downstream direction. The blades are spaced apart from each other, and arranged in pairs.

Such cutting blocks are described in US patent application publications 2004/0042407 and 2010/0236372. In this type of cutting block, the blades are arranged in rows in the general shape of a pyramid, and each pair of blades has a different downstream position. Traditionally the food products intended to be cut using these cutting blocks are potatoes.

The cutting block is generally positioned downstream from a hydraulic circuit including a conveyor in which the food products (e.g. potatoes) move at great speed. The food products are cut into fragments or small strips when they pass through the cutting block in the downstream direction.

In the cutting blocks described in US patent application publications 2004/0042407 and 2010/0236372, the blades have an undulated shape which may cut fragments having an original and decorative shape differing from the traditional rectilinear rod shape.

SUMMARY

In one aspect, embodiments disclosed herein may provide a cutting block for cutting food products into fragments having an "S" shape.

The cutting block may include an elongate support and a plurality of parallel blades secured to the support. The support may have a height, a breadth, and a length, wherein the height of the support is substantially parallel to a downstream direction of the food products, and wherein the breadth and the length of the support are substantially perpendicular to the height. The blades may extend in a direction along the breadth of the support. The blades may be arranged in pairs, wherein each pair of blades is positioned along the height of the support. Each blade in the pair may be aligned along the height of the support and spaced apart along the length of the support.

Each blade may comprise a substantially straight first outer portion, a substantially straight second outer portion parallel to the first outer portion, and a third middle portion joining the first outer portion to the second outer portion. The third middle portion may be inclined relative to the first and second outer portions, the first and second outer portions being spaced apart along the length of the support.

The third middle portion may comprise first and second curved ends connected by a straight portion, wherein the first curved end is connected to the first outer portion, and the second curved end is connected to the second outer portion. At least one of the first and second outer portions of each blade may be fastened to the support.

The "S" shape of fragments cut by the cutting block may be provided by the first, second and third portions which define the external shape of the cut fragment. In this regard, the blades of the cutting block may also be generally "S" shaped.

A fragment is cut from a food product by the passing of the food product between two adjacent blades of the cutting block. The shape of the two adjacent blades is thus imparted to the side edges of the fragment cut by those blades. Consequently, some embodiment of the cutting block described herein may cut fragments, each of which has at least one side edges that is substantially "S" shaped, similar to the shape of the blade of the cutting block.

In some embodiments, the first, second and third portions of each blade form one and the same piece. In other words, each of the blades of the cutting block may be integrally formed as one piece.

In some embodiments, a first distance in a direction along the height of the support between the first outer portions of adjacent blades may be equal to a second distance in the direction along the height of the support between the second outer portions of adjacent blades. This may permit the cutting block to cut fragments of food products in the shape of an "S" whose end portions have the same thickness.

In some embodiments, a third distance between the third middle portions of adjacent blades is equal to the first distance between the first outer portions of adjacent blades. This may permit the cutting block to cut fragments of food products in the shape of an "S" having a uniform thickness across the entire length of the fragments.

In some embodiments, the food product is a potato which may be whole and optionally peeled. Embodiments of the cutting block may be used to cut fragments of potato, where each fragment has an "S" shape and a uniform thickness the entire length of the fragment. Such fragments may be used to form French-fries that are uniformly cooked along their entire lengths.

In some embodiments, a third distance between the straight portions of the third middle portions of adjacent blades may be equal to the first distance between the first outer portions of adjacent blades.

In some embodiments, each of the blades may be spaced apart from each other blade along the length of the support, and differently positioned from each other blade along the breadth of the support. This may permit several "S" shaped fragments having different shapes to be cut from the same food product. For example, the length of the end portions and inclined middle portion may differ as between fragments cut from the same food product. Still, each fragment cut by the cutting block may have the same thickness.

In some embodiments, the support may be solid and the cutting block may further include a base connected to the support and extending along the breadth and length of the support. The base may include an opening, and the blades may extend through a cylindrical volume orthogonal to the base, wherein the opening defines a transverse section of the cylindrical volume. This may permit the blades, when viewed in projection along the height of the support, to cover the opening in the base.

In use, whole food products may enter the cutting block through the opening in the base before being cut by the blades. The base may have a first side from which the support extends parallel to the downstream direction of the food products, and a second side opposite to the first side. In this regard, the first side may be arranged downstream from the second side.

In some embodiments, the opening may be circular, and optionally centred on the base.

When the second side of the base is viewed along the downstream direction, the blades may be seen to extend across the opening to form a cutting grid.

When viewed in projection along the height of the support, the straight portion of the third middle portion of each of the blades may align with a diametric line of the opening.

In some embodiments, the support may comprise a first support element and a second support element. The first and second support elements may be arranged on opposite sides of the opening. The first outer portion may be fixed to the first support element, and the second outer portion may be fixed to the second support element. Accordingly, the blades may extend between the first and second support elements.

The first and second support elements may be in the shape of a pyramid. Each support element may have an upper side and a lower side, each side including adjacent parallel landings. The landings of the same side may be separated from each other along the length of the support. In this regard, each side of each support element may resemble a staircase. The distance along the length of the support between adjacent landings may substantially correspond to the space between two adjacent blades, and therefore also with the thickness of a fragment cut by those blades.

In some embodiments, when viewed along the first direction, the first and second support elements are parallel and preferably inclined in relation to the first and second outside portions of the blades. This incline may permit adjacent blades to have a different position along the breadth of the support.

Optionally, the first and second outside portions may have substantially the same length. Further, the length of the third middle portion of the blades may be less than the lengths of the first and second outside portions of the blades.

In some embodiments, the third middle portion of each blade is connected by first and second curved ends to the first and second outside portions. The curved ends may contribute to the "S" shape of a fragment cut by the blades. Optionally, the curved portions are shaped as arches.

In some embodiments, each blade has a first end and a second end, and the third middle portion of each blade may be located substantially equally between the first and second ends.

In some embodiments, the third middle portion may be inclined relative to the first outer portion at an angle of between 20° and 80° inclusive. In some embodiments, the third middle portion may be inclined relative to the first outer portion at an angle of between 50° and 75° inclusive.

In another aspect, a facility for cutting products is provided. The facility may include a food products conveyor for moving food products in a downstream direction, and an embodiment of the cutting block positioned downstream of the food products conveyor at an outlet of the food products conveyor.

In some embodiments, the facility may further comprise hydraulic fluid under pressure for moving food products inside of the conveyor to the cutting block.

In another aspect, a method of manufacturing fragments of food products is provided. The method may comprise providing food products (e.g. potatoes), and directing the food products through to an embodiment of the cutting block to cut the food products into fragments.

In another aspect, there is a fragment of food product having an "S" shape, wherein the fragment was obtained by a method of manufacturing fragments of food products using an embodiment of the cutting block.

In another aspect, a use of embodiments of the cutting block is provided for cutting food products (e.g. potatoes) into fragments having an "S" shape. In some embodiments, a use of the cutting block is provided for cutting food products into fragments having an "S" shape and a substantially constant thickness across their length.

DRAWINGS

DESCRIPTION OF VARIOUS EMBODIMENTS

Figure 1:
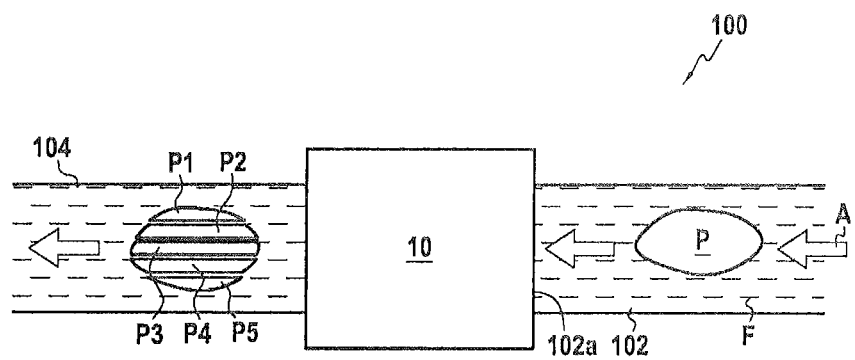
FIG. 1 shows a schematic of a facility for cutting food products including a cutting block, in accordance with at least one embodiment.

FIG. 1 shows a schematic of a food product cutting facility 100. Facility 100 includes a hydraulic conveyor 102 in which a hydraulic fluid F circulates to direct food products P to move in a downstream direction A. In this non-limiting example, food products P may be whole potatoes. It will be understood by those skilled in the art that products P may be any other suitable food products, such as root vegetable products.

Cutting facility 100 as shown also includes a cutting block 10, which is described in more detail below. Cutting block 10 is located at a downstream end 102a of conveyor 102.

In this example, the flow of hydraulic fluid F provides a means for moving potatoes P inside conveyor 102 towards cutting block 10. The flow of hydraulic fluid F may accelerate whole potatoes P and guide them in the downstream direction A through cutting block 10. Cutting block 10 in this example cuts potatoes P into fragments P1, P2, P3, P4, and P5. An outlet tube 104 is connected to the outlet of cutting block 10. Outlet tube 104 may guide potato fragments P towards a sorting station (not shown), for example.

FIG. 1 also illustrates a process for manufacturing food product fragments using a cutting block 10 in accordance with at least one embodiment. Optionally, fragments P1-P5 of potatoes P are intended to be used for making French fries.

Figure 1A:
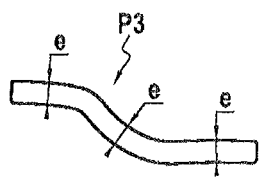
FIG. 1A shows on a side elevation view of a fragment of food product cut using the facility of FIG. 1.

FIG. 1A shows a fragment P3 cut from potato P by cutting block 10. As shown, fragment P3 has an "S" shape, and a thickness e which is significantly constant throughout the length of fragment P3.

An embodiment of cutting block 10 is now described in greater detail with reference to FIGS. 2 to 6.

In this example shown, cutting block 10 is substantially pyramidal shaped with a disc-shaped base 12, and a support 14 which extends substantially perpendicularly from base 12. Base 12 includes a first side 12a from which support 14 extends substantially perpendicularly, and a second side 12b opposed to first side 12a. Base 12 further includes a substantially circular opening 16, better visible on FIG. 6, through which food products P may enter into cutting block 10.

Figure 3:
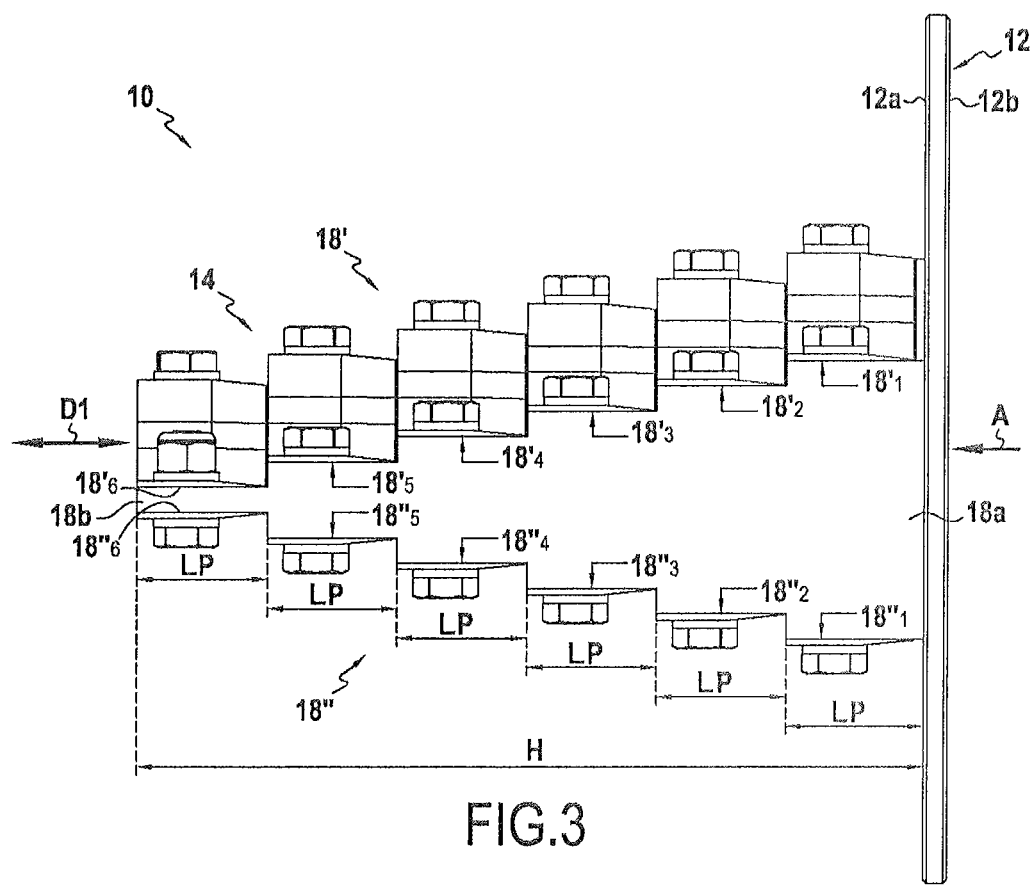
FIG. 3 is a side elevation view of the cutting block of FIG. 2.
Figure 4:
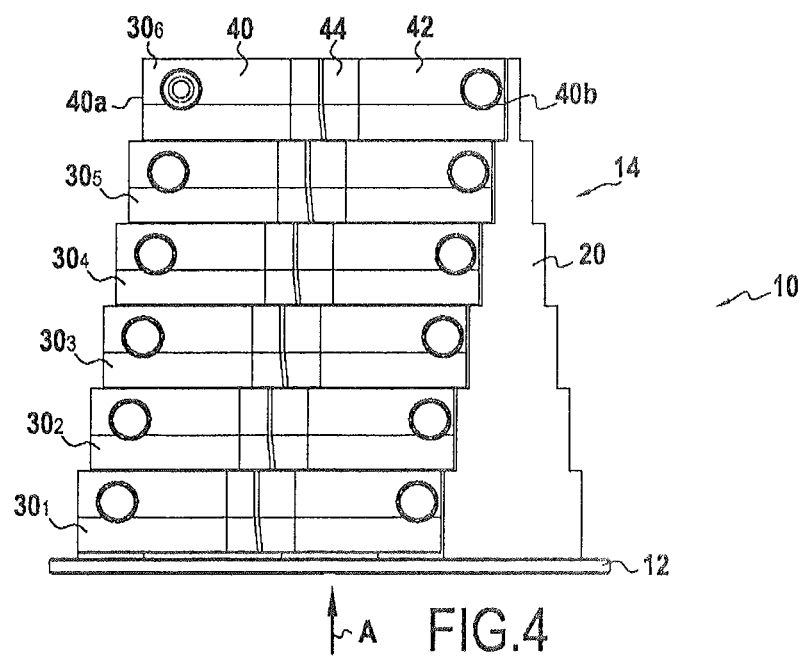
FIG. 4 is a top plan view of the cutting block of FIG. 2.

As shown in FIG. 3, a height H of support 14 extends in a first direction D1 substantially parallel to downstream direction A of food products P. Second side 12b of base 12 of cutting block 10 may be fixed to downstream end 102a of the conveyor 102.

Figure 5A:
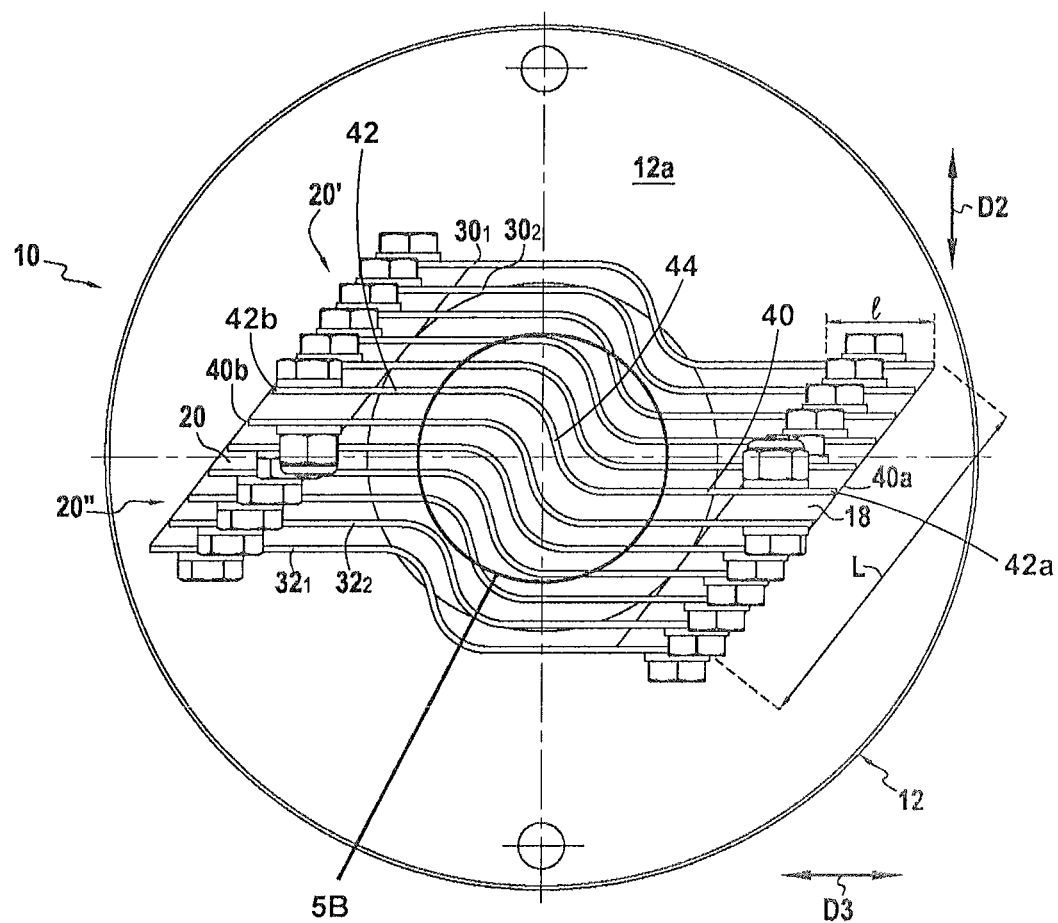
FIG. 5A is a front elevation view of the cutting block of FIG. 2.

In the example shown, support 14 includes a first support element 18 and a second support element 20. As shown in FIG. 5A, first and second support elements 18 and 20 are arranged on both sides of the opening 16, and extend substantially perpendicularly from first side 12a of base 12 in parallel with each other.

As shown, each of first and second support elements 18 and 20 are substantially pyramidal shaped. As first and second support elements 18 and 20 are preferably identical, only the first support element 18 will be described in detail.

First support element 18 is substantially pyramidal shaped, having a height H substantially perpendicular to first side 12a of base 12, a breadth I substantially perpendicular to height H, and a length L also substantially perpendicular to height H. Breadth I is the distance between the first support element 18 and second support element 20. Breadth I is preferably constant along the entire height H of each support element 18, 20. Length L optionally decreases along height H from first end 18a fixed to the base 12, towards second end 18b opposed to first end 18a. As shown in FIG. 3, height H corresponds to the distance between first and second ends 18a and 18b of first support element 18.

As shown, first support element 18 includes an upper side 18' and a lower side 18". Each of the upper 18' and lower 18" sides are in the shape of a stairway with a first series of parallel and adjacent landings $18'_1$, $18'_2$, $18'_3$, $18'_4$, $18'_5$ and $18'_6$ on upper side 18', and a second series of parallel and adjacent landings $18''_1$, $18''_2$, $18''_3$, $18''_4$, $18''_5$ and $18''_6$ on lower side 18". Two adjacent landings are separated by a projection forming a step.

Figure 2:
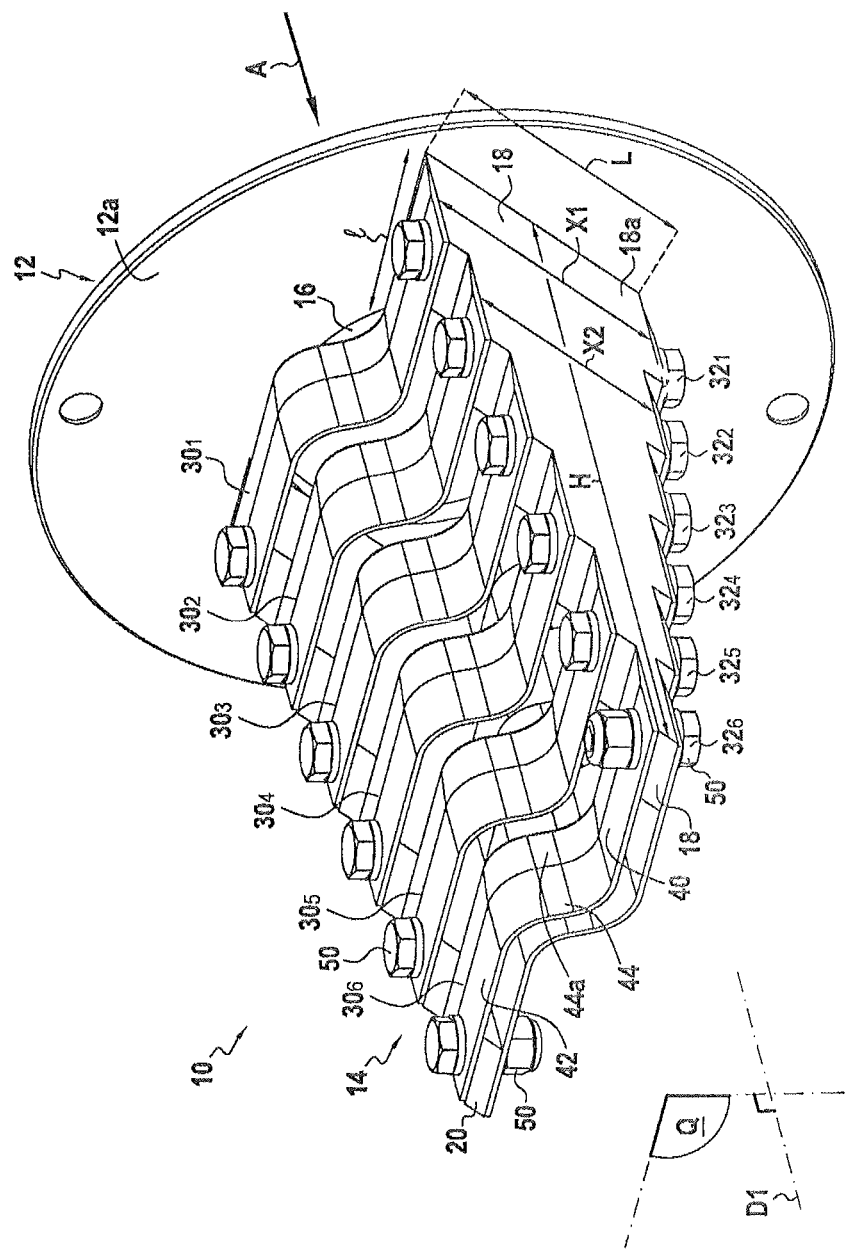
FIG. 2 shows a perspective view of a cutting block in accordance with at least one embodiment.

As shown in FIGS. 2 and 3, each of landings $18'_1$, $18'_2$, $18'_3$, $18'_4$, $18'_5$ and $18'_6$ has the same length LP and the same breadth I.

In the example shown, first support element 18 includes six pairs of landings 18' and 18". However, in alternative embodiments, there may be fewer or a greater number of pairs of landings 18' and 18".

The pyramidal shape of first support element 18 is such that the distance (length L) between a landing 18', on upper side 18' and a landing $18''_n$ on a lower side 18" decreases for landings $18'_n$ and $18''_n$ toward second end 18b of first support element 18. For example, as shown in FIG. 2, a distance X2, between the second landing $18'_2$ of upper side 18' and second landing $18''_2$ of lower side 18", is less than a distance X1, between first landing $18'_1$ of upper side 18' and first landing $18''_1$ of the lower side 18".

As best shown in FIG. 5A, when viewed in downstream direction A, first support element 18 is substantially parallelogram-shaped, having an internal angle of about 45° in the embodiment shown. The significance of this parallelogram shape is described in more detail below.

As mentioned previously, second support element 20 is preferably identical to first support element 18. Therefore, the second support element 20 may include the same series of landings as are found on first support element 18.

Cutting block 10 also includes a plurality of parallel blades 30 and 32. Each blade 30 and 32 is fixed to support 14 and extends along the breadth of support 14 perpendicularly to direction D1. Each of the blades 30 and 32 has a surface extending in direction D1 and perpendicular to side 12a of base 12.

As can be seen in FIGS. 3 and 5A, each of blades 30 and 32 is spaced apart from each other blade 30 and 32 along the length L of support 14, and blades 30 and 32 are arranged in pairs of blades $30_i$ and $32_i$. Each pair of blades $30_i$ and $32_i$ is aligned along the height H of support 14.

For example, blades 30 and 32 include a first pair of blades $30_1$ and $32_1$ consisting of the blades positioned closest to base 12. A second pair $30_2$ and $32_2$, is positioned next to first pair of blades $30_1$ and $32_1$. The other four pairs of blades are similarly arranged. As shown, the blades within the same pair of blades are parallel to each other and parallel to the blades of the other pairs of blades.

In the example shown, all blades 30 and 32 of cutting block 10 are identical. That is, the blades 30 and 32 in the same pair are identical to each other, and also identical to the blades 30 and 32 in each of the other pairs.

Referring now to FIGS. 2, 4, 5A and 5B, the structure of an exemplary blade 30 or 32, is now described in more detail.

As shown, each blade 30 and 32 includes a substantially straight first outer portion 40, a substantially straight second outer portion 42 parallel to the first outer portion 40, and a third middle portion 44 joining the first and second outer portions 40 and 42. As better seen in FIGS. 2, 5A and 5B, third middle portion 44 is inclined relative to first and second outer portions 40 and 42. Further, first and second outer portions 40 and 42 are spaced apart along length L of support 14.

Each third middle portion 44 includes first and second curved ends 44b and 44d connected by a straight portion 44a. As better seen in FIG. 5B, first curved end 44b is connected to first outer portion 40, and second curved end 44d is connected to second outer portion 42. Straight portion 44a extends at an incline relative to first and second outer portions 40 and 42.

In the example shown, each blade has a first end 42a and a second end 42b. Third middle portion 44 may be located substantially equally between first and second ends 42a and 42b.

In the example shown, first and second outer portions 40 and 42 have substantially the same length. Optionally, third middle portion 44 has a length less than the length of first and second outer portions 40 and 42.

Figure 5B:
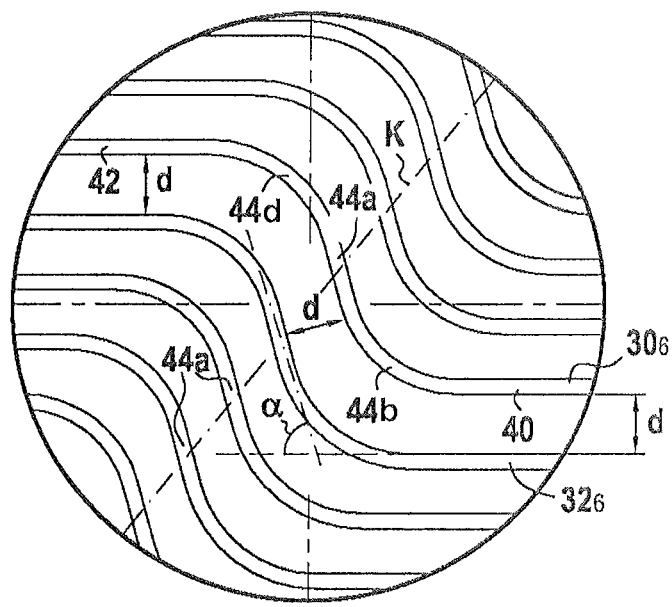
FIG. 5B is an enlarged view of region 5B of FIG. 5A.

As shown in FIG. 5B, third middle portion 44, or more particularly straight portion 44a of middle portion 44 is inclined relative to first outer portion part 40 at an angle α. In some embodiments, angle α is between about 20° and 80° inclusive, or more preferably between about 50° and 75° inclusive. In the example shown, angle α is approximately 60°.

At least one of the first and second outer portions 40 and 42 is fastened to support 14. In the example shown, first outer portion 40 of each of blades 30 and 32 is fastened to first support element 18 and second outer portion 42 of each blade 30 and 32 is fastened to second support element 20.

As shown in FIG. 5B, when viewed in projection along the height H of support 14, the straight middle portion 44a of each third middle portion 44 aligns with a diametric line K of opening 16.

In the example shown, each first outer portion 40 of the blades $30_i$ is fastened to one of landings $18'_i$ on upper side 18' of first support element 18. Similarly, each second outer portion 42 of blades $32_i$ is fastened to one of landings $18''_i$ on the lower side 18" of the first support element 18.

Further, each second outer portion 42 of the blades $30_i$ is fastened to one of the landings on the upper side 20' of second support element 20. Similarly, each second outer portion 42 of the blades $32_i$ is fastened to one of the landings on the lower side 20" of second support element 20. In the example shown, blades 30 and 32 are fastened to first and second support element 18 and 20 by bolts 50.

As shown in FIG. 5B, the spacing being any two adjacent blades 30 or 32 may be constant throughout the length of the two blades 30 or 32. As used herein, adjacent blades are fastened to the same side (upper or lower) of first and second support elements 18 and 20, except for blades $30_6$ and $32_6$ located at second end 18b opposite to base 12 which are considered to be adjacent despite being fastened to opposite sides of first and second support elements 18 and 20.

For example, when viewed in projection along a plane Q orthogonal to direction D1, a distance d between the first outer portions 40 of two adjacent blades (e.g. first outer portions 40 of blades $30_1$ and blade $30_2$) is equal to the distance d between the second outer portions 42 of the same adjacent blades $30_1$ and $30_2$. This may be true for every two adjacent blades 30 or 32.

Moreover, the distance d between the third middle portions 44 of two adjacent blades 30 or 32 (e.g. adjacent blades $30_1$ and $30_2$) may also be equal to the distance d between the first outer portions 40 of the same two adjacent blades 30 or 32. As used herein, the distance d between the third middle portions 44 of two adjacent blades 30 or 32 is measured between the straight portions 44a of the third middle portions 44 of the two adjacent blades 30 or 32.

Referring again to FIG. 5A, when viewed in projection along plane Q, blades 30 and 32 are spaced apart from each other in a direction D2 which is orthogonal to direction D1 (i.e. along the length of support 14). Further, each blade 30 and 32 is differently positioned from each other blade 30 and 32 along a direction D3 (i.e. along the breadth of support 14), which is orthogonal to directions D1 and D2.

This spacing and positioning of blades 30 and 32 is provided by the shape of the first and second support elements 18 and 20, each of which has a parallelogram shape when viewed in projection along plane Q. The inclination of the parallelogram shape permits adjacent blades to be spaced consistently equally.

As shown in FIG. 5A, when viewed in projection along plane Q, blades 30 and 32 provide a cutting grid having a constant spacing between all adjacent blades.

Figure 6:
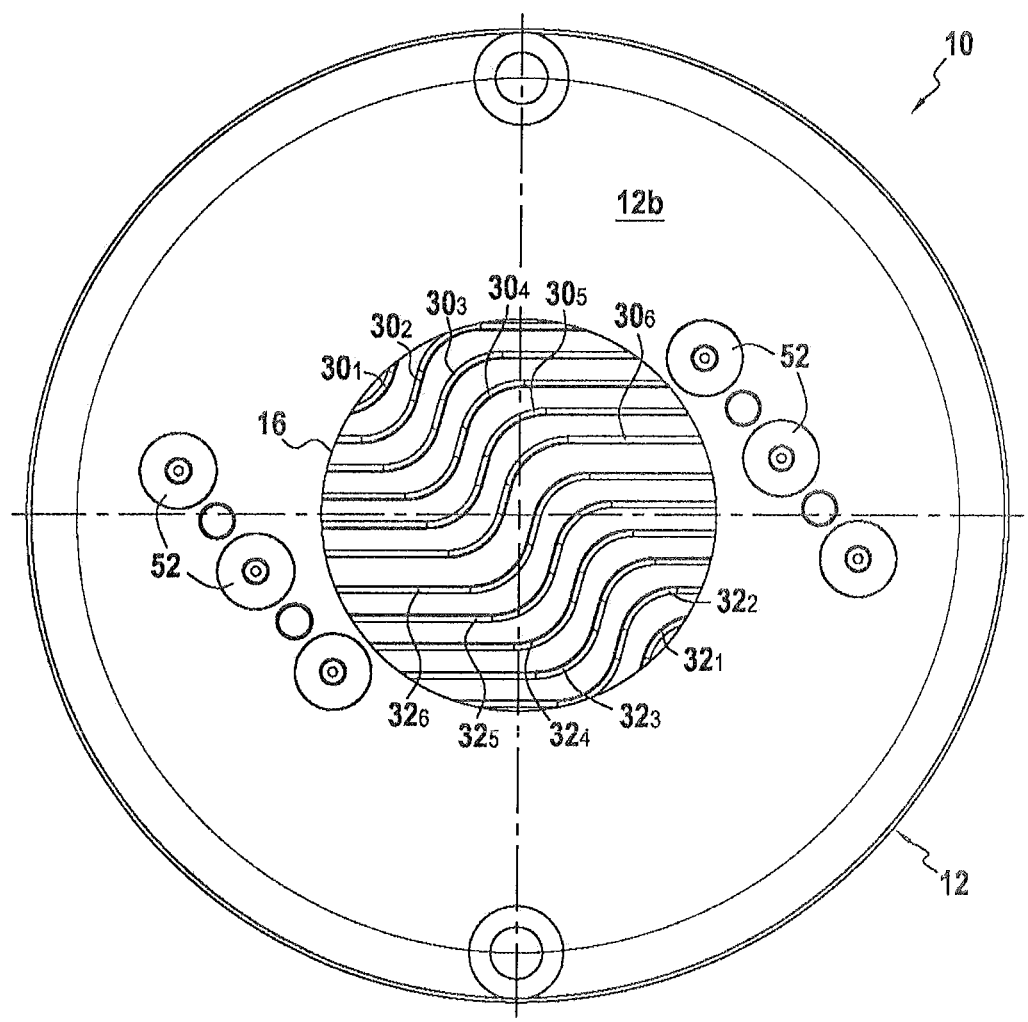
FIG. 6 is a rear elevation view of the cutting block of FIG. 2.

Referring now to FIG. 6, first and second support elements 18 and 20 are fastened to base 12 by any suitable fasteners 52, such as bolts. Moreover, as shown, when viewed in downstream direction D1, at least some of blades 30 and 32 extend across opening 16 of base 12. More specifically, blades 30 and 32 extend through a cylindrical volume orthogonal to base 12, where opening 16 defines a transverse section of the cylindrical volume.

As shown, an effective cutting area of cutting block 10 is defined by the portions of blades 30 and 32 which extend across circular opening 16 when viewed in projection in downstream direction A. A potato (or other food product) P entering into cutting block 10 through opening 16 may be first cut by blades $30_1$ and $32_1$ (which cut the outside surfaces of the potato), with the outside surfaces of the potato being then subsequently cut by the pair of blades $30_2$ and $32_2$ and so forth, until a final cut by the last pair of blades $30_6$ and $32_6$. The plurality of fragments cut by the cutting block may have an "S" shape as shown in FIG. 1a.

The invention claimed is:

1. A cutting block for food products, the cutting block comprising:
an elongate support having a height, a breadth, and a length, wherein the height of the support is substantially parallel to a downstream direction of the food products, wherein the breadth and the length of the support are substantially perpendicular to the height; and
a plurality of parallel blades secured to the support, the blades extending in a direction along the breadth of the support, the blades being arranged in pairs, wherein each pair of blades is positioned along the height of the support, each blade in the pair being aligned along the height of the support and spaced apart along the length of the support;
each blade comprising a substantially straight first outer portion, a substantially straight second outer portion parallel to the first outer portion, and a third middle portion joining the first outer portion to the second outer portion, the third middle portion being inclined relative to the first and second outer portions, the first and second outer portions being spaced apart along the length of the support;
wherein the third middle portion comprises first and second curved ends connected by a straight portion, wherein the first curved end is connected to the first outer portion, and the second curved end is connected to the second outer portion,
at least one of the first and second outer portions of each blade being fastened to the support.

2. The cutting block of claim 1, wherein:
a first distance in a direction along the height of the support between the first outer portions of adjacent blades is equal to a second distance in the direction along the height of the support between the second outer portions of adjacent blades.

3. The cutting block of claim 2, wherein:
a third distance between the third middle portions of adjacent blades is equal to the first distance.

4. The cutting block of claim 2, wherein:
a third distance between the straight portions of the third middle portions of adjacent blades is equal to the first distance.

5. The cutting block of claim 1, wherein:
each of the blades is spaced apart from each other blade along the length of the support, and differently positioned from each other blade along the breadth of the support.

6. The cutting block of claim 1, further comprising:
a base connected to the support and extending along the breadth and length of the support,
the base having an opening, and
the blades extending through a cylindrical volume orthogonal to the base, wherein the opening defines a transverse section of the cylindrical volume.

7. The cutting block of claim 6, wherein:
viewed in projection along the height of the support, the straight portion of the third middle portion of each of the blades aligns with a diametric line of the opening.

8. The cutting block of claim 6, wherein:
the support comprises a first support element and a second support element,
the first and second support elements being arranged on opposite sides of the opening,
the first outer portion being fixed to the first support element, and the second outer portion being fixed to the second support element.

9. The cutting block of claim 1, wherein
a length of the first outer portion is substantially the same as a length of the second outer portion.

10. The cutting block of claim 1, wherein:
the third middle portion has a length less than the lengths of the first and second outer portions.

11. The cutting block of claim 1, wherein:
each blade has a first end and a second end, and
the third middle portion of each blade is located substantially equally between the first and second ends.

12. The cutting block of claim 1, wherein:
the third middle portion is inclined relative to the first outer portion at an angle of between 20° and 80° inclusive.

13. The cutting block of claim 1, wherein:
the third middle portion is inclined relative to the first outer portion at an angle of between 50° and 75° inclusive.

14. A method of manufacturing fragments of a food product, the method comprising:
directing the food product to a cutting block, the cutting block comprising:
an elongate support having a height, a breadth, and a length, wherein the height of the support is substantially parallel to a downstream direction of the food product, wherein the breadth and the length of the support are substantially perpendicular to the height; and
a plurality of parallel blades secured to the support, the blades extending in a direction along the breadth of the support, the blades being arranged in pairs, wherein each pair of blades is positioned along the height of the support, each blade in the pair being aligned along the height of the support and spaced apart along the length of the support;
each blade comprising a substantially straight first outer portion, a substantially straight second outer portion parallel to the first outer portion, and a third middle portion joining the first outer portion to the second outer portion, the third middle portion being inclined relative to the first and second outer portions, the first and second outer portions being spaced apart along the length of the support;
wherein the third middle portion comprises first and second curved ends connected by a straight portion, wherein the first curved end is connected to the first outer portion, and the second curved end is connected to the second outer portion,
at least one of the first and second outer portions of each blade being fastened to the support; and
cutting the food product into a plurality of fragments by passing the food product through the cutting block.

15. The method of claim 14, wherein:
a first distance in a direction along the height of the support between the first outer portions of adjacent blades is equal to a second distance in the direction along the height of the support between the second outer portions of adjacent blades.

16. The method of claim 15, wherein:
a third distance between the third middle portions of adjacent blades is equal to the first distance.

17. The method of claim 14, wherein:
each of the blades is spaced apart from each other blade along the length of the support, and differently positioned from each other blade along the breadth of the support.

18. The method of claim 14, further comprising:
a base connected to the support and extending along the breadth and length of the support,
the base having an opening, and
the blades extending through a cylindrical volume orthogonal to the base, wherein the opening defines a transverse section of the cylindrical volume.

19. The method of claim 14, wherein:
the first outer portion is fixed to the first support element, and the second outer portion is fixed to the second support element.

* * * * *